United States Patent
Jeong et al.

(10) Patent No.: US 11,230,286 B2
(45) Date of Patent: Jan. 25, 2022

(54) SYSTEM AND METHOD FOR INSPECTING VEHICLE LANE KEEPING PERFORMANCE

(71) Applicants: HYUNDAI MOTOR COMPANY, Seoul (KR); KIA MOTORS CORPORATION, Seoul (KR)

(72) Inventors: Jae Cheol Jeong, Siheung-si (KR); TaeJong Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 249 days.

(21) Appl. No.: 16/416,637

(22) Filed: May 20, 2019

(65) Prior Publication Data
US 2020/0156634 A1  May 21, 2020

(30) Foreign Application Priority Data

Nov. 19, 2018 (KR) .......................... 10-2018-0142898

(51) Int. Cl.
 *B60W 30/12* (2020.01)
 *G08G 1/16* (2006.01)
 *G07C 5/08* (2006.01)

(52) U.S. Cl.
CPC .......... *B60W 30/12* (2013.01); *G07C 5/0808* (2013.01); *G08G 1/167* (2013.01)

(58) Field of Classification Search
CPC ..... B60W 30/12; G08G 1/167; G07C 5/0808; G07C 5/0841; G07C 5/008; G01M 17/007; B60R 16/0231; B60R 16/0232; B60R 16/023; B60R 16/03; G01S 19/42
See application file for complete search history.

(56) References Cited

U.S. PATENT DOCUMENTS

| | | | |
|---|---|---|---|
| 2003/0055562 A1* | 3/2003 | Levy | G01C 21/28 701/409 |
| 2012/0191271 A1* | 7/2012 | Stuebing | B60W 30/12 701/2 |
| 2019/0088148 A1* | 3/2019 | Jacobus | H04W 4/026 |
| 2019/0310091 A1* | 10/2019 | Maeda | G01C 21/30 |

* cited by examiner

*Primary Examiner* — Michael V Kerrigan
(74) *Attorney, Agent, or Firm* — Morgan, Lewis & Bockius LLP

(57) ABSTRACT

A system for inspecting vehicle lane keeping performance includes: an on-board diagnostic device (OBD) connected to a controller of a vehicle via controller area network communication to receive driving information; and an inspection terminal installed in the vehicle, connecting short-range wireless communication with the OBD, measuring position information of the vehicle on a road using a precision global positioning system, receiving the driving information to determine whether lane following assist function (LFA) function operates normally when the vehicle crosses over a line of a lane beyond a centerline of the lane and to determine whether a lane keeping assist function (LKA) function operates normally when the vehicle departs from the lane, and controlling the vehicle to move into the lane by applying a steering signal to the vehicle when at least one of the LFA function or LKA function does not operate normally.

20 Claims, 9 Drawing Sheets

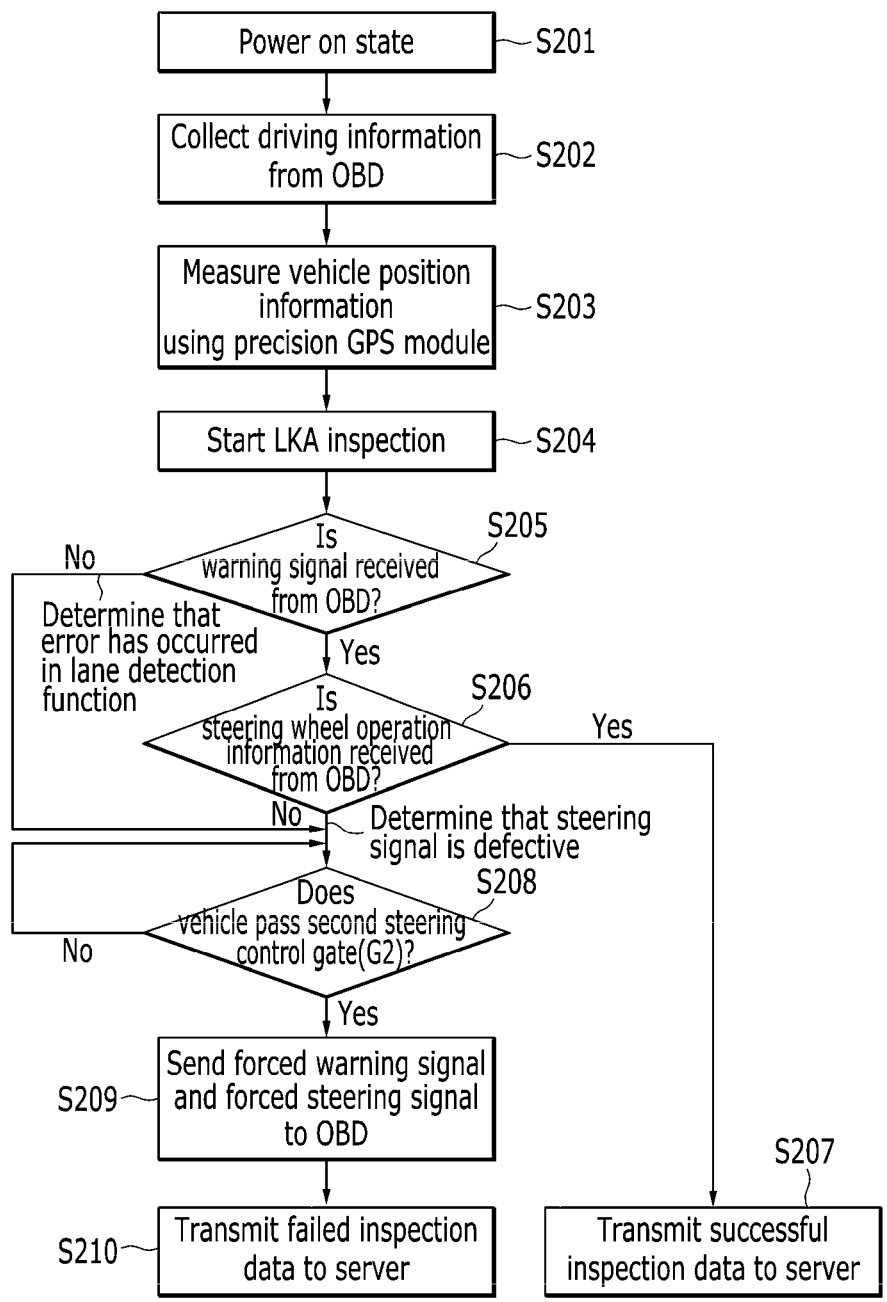

SYSTEM AND METHOD FOR INSPECTING VEHICLE LANE KEEPING PERFORMANCE

CROSS-REFERENCE TO RELATED APPLICATION

This application claims priority to and the benefit of Korean Patent Application No. 10-2018-0142898 filed in the Korean Intellectual Property Office on Nov. 19, 2018, the entire contents of which are incorporated herein by reference.

TECHNICAL FIELD

The present disclosure relates to a system and a method for checking lane keeping performance, and more particularly, to a system and a method for inspecting vehicle lane keeping performance during driving of a vehicle with driving safety assistance function in a driving test center.

BACKGROUND

Generally, a driver of a vehicle may face many unexpected dangerous situations due to, for example, drowsy driving, poor driving, reckless driving, or road conditions during driving of the vehicle.

An advanced driver assistance system (ADAS) has been developed to assure safety of the vehicle by allowing the vehicle to determine the dangerous situations during driving.

ADAS technology includes lane following assist (LFA) function and lane keeping assist (LKA) function to help a driver of a vehicle to operate the vehicle more safely.

The LFA function is a system that controls steering of the vehicle and keeps the vehicle in the center of a lane. The LKA function allows the vehicle to stay in the lane through steering control for the vehicle using a camera when the lane departure of the vehicle occurs. Both the LFA function and the LKA function may recognize lines of the lane and may automatically steer a steering wheel of the vehicle to stay in the lane.

In the vehicle factory, a worker is performing subjective inspection using sight and hearing to check whether the LFA function and the LKA function applied to the vehicle works properly.

However, the conventional subjective inspection method depends only on judgment of workers. Thus, human error may occur so that deterioration of the vehicle quality occurs.

In addition, since a worker performs inspection using only results of operations of the LFA function and the LKA function, the LFA function and the LKA function may not be inspected under a real-time operation condition for each function. Thus, the inspection reliability may decrease.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a system and a method for inspecting vehicle lane keeping performance of a vehicle that quantitatively inspect operation states of lane following assist (LFA) function and lane keeping assist (LKA) function according to precise position information of the vehicle on a road by installing an inspection terminal including a precision GPS in the vehicle.

Further, the present disclosure has been made in an effort to provide the system and the method for inspecting vehicle lane keeping performance that record inspection history collected at the inspection terminal during processes for inspecting the LFA function and the LKA function so that the inspection history is analyzed when a problem occurs in the vehicle.

According to an exemplary embodiment of the present disclosure, a system for inspecting vehicle lane keeping performance that inspects a lane following assist function and a lane keeping assist function of a vehicle includes: an on-board diagnostic device that is connected to a controller of the vehicle via controller area network communication to receive driving information according to operation of the vehicle; and an inspection terminal that is installed in the vehicle, connects short-range wireless communication with the on-board diagnostic device, measures position information of the vehicle on a map of a road during a running test of the vehicle using a precision global positioning system, receives the driving information from the on-board diagnostic device to determine whether the lane following assist function operates normally when the vehicle crosses over a line of a lane beyond a centerline of the lane and to determine whether the lane keeping assist function operates normally when the vehicle departs from the lane, and controls the vehicle to move into the lane by applying a steering signal to the vehicle when at least one of the lane following assist function or the lane keeping assist function does not operate normally.

The system for inspecting vehicle lane keeping performance may further include: a server configured to control an operational status of a driving test center for the vehicle and to identify the vehicle via the on-board diagnostic device and to collect the lane following assist function inspection data and the lane keeping assist function inspection data from the inspection terminal via wireless communication to store the collected inspection data.

The on-board diagnostic device may be configured to match vehicle identification number and specification information of the vehicle with its own identification to share the matched information with the inspection terminal and the server.

The inspection terminal may be configured to measure through the precision global positioning system a situation in which the vehicle under the running test approaches the lane off the centerline or departs from the lane.

The inspection terminal may be configured to generate the steering signal having a steering angle opposite to a current steering angle of the vehicle.

The inspection terminal may include: the precision global positioning system configured to measure precise position information of the vehicle by eliminating an error factor regarding a satellite; a controller area network communication device connecting short-range wireless communication with the on-board diagnostic device of the vehicle to transmit and receive data with the on-board diagnostic device; a wireless communication device configured to connect wireless communication with the server and to transmit inspection data collected according to the lane following assist function inspection and the lane keeping assist function inspection; a power supply configured to supply power to the inspection terminal through a socket connection with the vehicle or a battery; a storage configured to store programs and data for inspecting vehicle lane keeping performance of the vehicle and to store the inspection data collected according to the lane following assist function inspection and the lane keeping assist function inspection; and a processor configured to perform the lane following assist function inspection and the lane keeping assist function inspection during driving of the vehicle so that the processor collects the inspection data via the on-board diagnostic device to record the collected inspection data in the storage.

The inspection data may include driving information, operation state, and log data of the vehicle recorded according to time from start of the lane following assist function and the lane keeping assist function to end of the lane following assist function and the lane keeping assist function.

The processor may be configured to generate a virtual vehicle having position information, moving direction, and specification of the vehicle based on a precision global positioning system coordinate of the inspection terminal mounted at a center of a dashboard of the vehicle, and may be configured to display the virtual vehicle on the road map.

The storage may be configured to store the road map coordinate, and coordinates of a virtual centerline formed at a center of both lines of the lane, a virtual inspection start gate set in a width direction of the lane, a virtual first steering control gate set at both lines, and a virtual second steering control gate spaced by a predetermined distance from an outer direction of both lines may be set on the road map.

The processor may be configured to determine that the lane following assist function does not operate normally when the vehicle is out of the virtual centerline and passes the virtual first steering control gate, and may be configured to transmit a warning signal and a steering signal according to a lane following assist function error determination to the on-board diagnostic device to control the vehicle to be on the virtual centerline.

The processor may be configured to determine that the lane keeping assist function does not operate normally when the vehicle passes the virtual second steering control gate, and may be configured to transmit a warning signal and a steering signal according to a lane keeping assist function error determination to the on-board diagnostic device to control the vehicle to enter the lane.

The processor may be configured to record a determination result of the lane following assist function inspection and the lane keeping assist function inspection and inspection data regarding the determination result that correspond to a vehicle identification number of the vehicle, and may be configured to transmit the recorded inspection data to the server via wireless communication.

According to an exemplary embodiment of the present disclosure, a method for inspecting vehicle lane keeping performance of an inspection terminal that is installed in a vehicle and inspects a lane following assist function and a lane keeping assist function of the vehicle during a road running test of the vehicle, includes steps of: a) connecting, by the inspection terminal, short-range wireless communication with an on-board diagnostic device that is installed in the vehicle when a power of the inspection terminal is turned on and measuring the vehicle position information on a map of a road using a precision global positioning system; b) determining, by the inspection terminal, that the vehicle enters an inspection section when the vehicle passes a virtual inspection start gate set on both lines of the lane so that the inspection terminal collects driving information of the vehicle from the on-board diagnostic device; c) determining, by the inspection terminal, whether the lane following assist function operates normally when the vehicle is off a centerline of the lane and approaches a line of the lane; d) determining, by the inspection terminal, whether the lane keeping assist function operates normally when the vehicle departs from the lane; and e) controlling, by the inspection terminal, the vehicle to move into the lane by applying a steering signal to the vehicle when at least one of the lane following assist function or the lane keeping assist function does not operate normally.

Step a) may include: generating, by the inspection terminal, a virtual vehicle having position information, moving direction, and specification of the vehicle based on a precision global positioning system coordinate of the inspection terminal mounted at a center of a dashboard of the vehicle and displaying the virtual vehicle on the road map.

Step b) may include: recording, by the inspection terminal, inspection data according to collection of the driving information of the vehicle from the vehicle's passage of the virtual inspection start gate to completion of the inspection.

Step c) may include: determining, by the inspection terminal, that an error has occurred in a lane detecting function included in the lane following assist function when a warning signal is not received from the on-board diagnostic device at a lane following assist function control time when the vehicle is off the centerline of the road and approaches the lane; and determining, by the inspection terminal, that a steering signal for the lane following assist function is defective when the vehicle passes a virtual first steering control gate set at the lane in a state where steering wheel operation information for the lane following assist function is not received from the on-board diagnostic device after the warning signal is received.

Step e) may include: transmitting, by the inspection terminal, the warning signal and the steering signal according to a lane following assist function error to the vehicle so that the inspection terminal controls the vehicle to be on the centerline.

Step d) may include: determining, by the inspection terminal, that an error has occurred in the lane detecting function included in the lane keeping assist function when a warning signal is not received from the on-board diagnostic device at the lane keeping assist function control time when the vehicle leaves the lane; and determining, by the inspection terminal, that a steering signal for the lane keeping assist function is defective when the vehicle passes a virtual second steering control gate spaced by a predetermined distance from an outer direction of the lane in a state where steering wheel operation information for the lane keeping assist function is not received from the on-board diagnostic device after the warning signal is received.

Step e) may include: transmitting, by the inspection terminal, the warning signal and the steering signal according to a lane keeping assist function error to the vehicle so that the inspection terminal controls the vehicle to enter the lane.

The method for inspecting vehicle lane keeping performance of the inspection terminal may further include: between step c) and step d), performing, by the inspection terminal, the lane keeping assist function inspection after the inspection terminal transmits a message for forcibly disabling the lane following assist function to the vehicle via the on-board diagnostic device to receive a lane following assist function deactivation response.

The system and the method for inspecting vehicle lane keeping performance according to the exemplary embodiment of the present disclosure may mount the inspection terminal including the precision GPS in the vehicle to perform the LFA function inspection and the LKA function inspection during driving of the vehicle, thereby solving a human error problem and improving the inspection reliability.

The exemplary embodiment of the present disclosure may reduce a field claim problem and may improve customer satisfaction by providing the vehicle that has proven the LFA function performance and the LKA function performance through a running test of the vehicle on an actual road.

Further, the exemplary embodiment of the present disclosure may record the inspection history collected from the inspection terminal during the LFA and LKA function inspections of the vehicle so that the inspection history is analyzed when a problem occurs in the LFA and LKA function inspections.

BRIEF DESCRIPTION OF THE DRAWINGS

FIG. 7 is a flowchart outlining the LKA function inspection method according to an exemplary embodiment of the present disclosure.

DETAILED DESCRIPTION OF THE EMBODIMENTS

Figure 1:
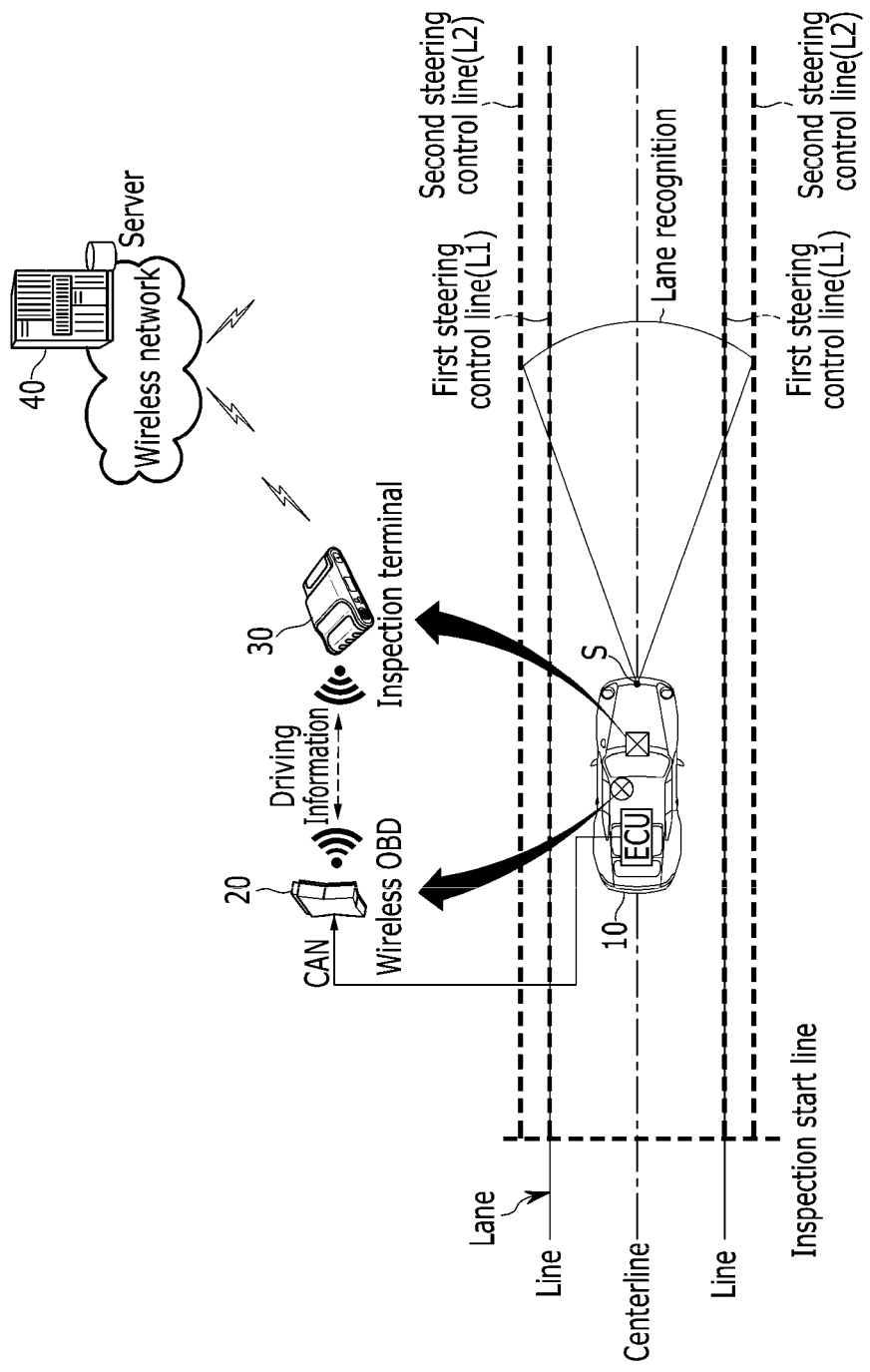
FIG. 1 shows an overview of a system for inspecting vehicle lane keeping performance according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

It will be understood that when an element is referred to as being "connected," or "coupled," to another element throughout the specification, it can be directly connected or coupled to the other element or intervening elements may be present. In contrast, when an element is referred to as being "directly connected," or "directly coupled," to another element, there are no intervening elements present.

Throughout the specification, a time at which a vehicle passes a line of a lane or a gate may mean a time at which a portion of the vehicle crosses outside the lane or the gate.

A system and a method for inspecting vehicle lane keeping performance according to an exemplary embodiment of the present disclosure will now be described in detail with reference to the drawings.

FIG. 1 shows an overview of the system for inspecting vehicle lane keeping performance according to an exemplary embodiment of the present disclosure.

Figure 2:
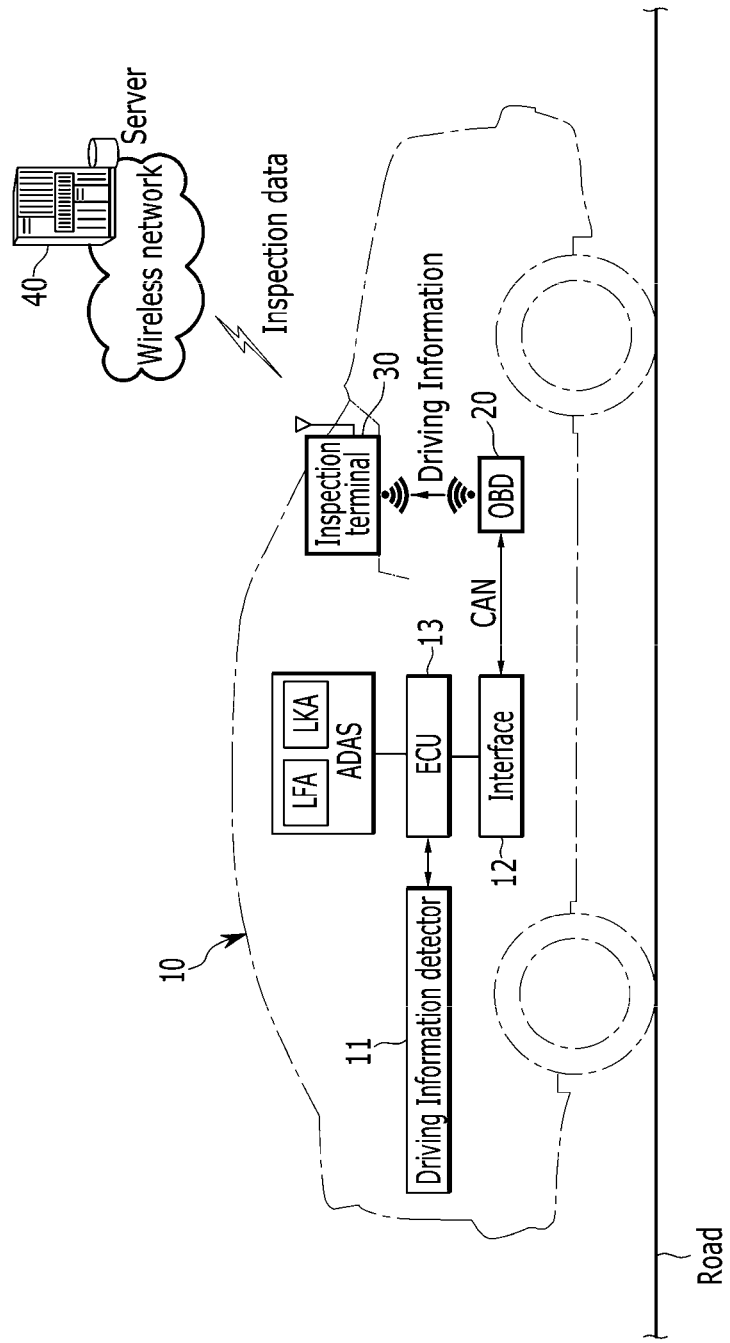
FIG. 2 shows a network structure of the system for inspecting vehicle lane keeping performance according to an exemplary embodiment of the present disclosure.

FIG. 2 shows a network structure of the system for inspecting vehicle lane keeping performance according to an exemplary embodiment of the present disclosure.

Referring to FIGS. 1 and 2, the system or a device for inspecting vehicle lane keeping performance may include a vehicle 10, an on-board diagnostic system or an on-board diagnostic device (OBD) 20, an inspection terminal or an inspection device 30, and a server 40.

The vehicle 10 may have driving safety assistance function including lane following assist (LFA) function and lane keeping assist (LKA) function. The LFA function may control steering of the vehicle and may keep the vehicle in a center of a lane. The LKA function may allow the vehicle to stay in a lane through steering control for the vehicle using a camera when the lane departure of the vehicle occurs. Both of the LFA function and the LKA function may recognize lines of the lane and may automatically steer a steering wheel of the vehicle 10 to stay the lane. The vehicle 10 may be put into a road running test at a driving test center or a driving test site.

The vehicle 10 may be assembled in a production line of a factory. After inspection for the vehicle, the vehicle 10 may be transferred to the driving test center. The vehicle 10 may have verified wheel alignment and steering wheel performance for performing the LFA and LKA functions.

The OBD 20 may be mounted on the vehicle to monitor assembly and inspection of the vehicle 10 in the production line and may serve to relay controller area network (CAN) communication between the vehicle and the inspection terminal 30. The CAN communication may be referred to as diagnosis communication.

The OBD 20 may collect data generated according to the LFA and LKA function inspections of the vehicle 10 and may transmit the collected data to the inspection terminal 30 through short-range wireless communication or near field communication.

The OBD 20 may be mounted on the vehicle 10 at the production line of the factory, may receive a vehicle identification number VIN and specification information of the vehicle, and may match the received vehicle identification number and specification information with its own identification (ID) of the OBD to share the matched information with the inspection terminal 30 and the server 40. The OBD 20 may transmit data collected from the vehicle 10 to an outside device (e.g., the inspection terminal 30 and the server 40) through the OBD ID. This allows the outside device to manage movement and process state of the vehicle 10 matched to the OBD ID.

The inspection terminal 30 may be mounted on a dashboard of the vehicle 10 and may be connected to the OBD 20 via short-range wireless communication. The short-range wireless communication may use WiFi communication or Bluetooth communication.

The inspection terminal 30 may calculate position information of the vehicle 10 on a road during driving of the vehicle using a precision global positioning system (GPS) (e.g., a differential GPS). The inspection terminal 30 may quantitatively inspect operation states of the LFA and LKA functions according to the position information of the vehicle. The precision GPS may have high positioning accuracy of several centimeters (e.g., 2 cm) by eliminating various error factors from a conventional GPS.

The inspection terminal 30 may store a road map of the driving test center and may identify through the precision GPS whether the vehicle 10 under running test approaches a line off a centerline of a lane or departs from the lane.

The inspection terminal 30 may receive CAN data from the OBD 20 so that the inspection terminal determines whether the LFA function operates normally when the vehicle 10 crosses over a line beyond the centerline of the lane and determines whether the LKA function operates normally when the vehicle departs from the lane. The inspection terminal 30 may control the vehicle to forcibly move into the lane by applying a forced steering signal to the vehicle when at least one of the LFA or LKA functions does not operate normally.

The server 40 may be a system or a device that controls an operational status of the driving test center and may include at least one computer, a database (DB), and a wireless communication device.

The server 40 may identify the vehicle 10 via a wireless OBD 20 and may collect the LFA function inspection data and the LKA function inspection data of the vehicle 10 from the inspection terminal 30 to store the collected data.

Referring to FIG. 2, the vehicle 10 may include a driving information detector 11, an interface (or an interface unit) 12, and a controller 13 such as an electronic control unit (ECU).

The driving information detector 11 may collect driving information according to operation of the vehicle 10 from various sensors and control devices. For example, the driving information detector 11 may detect driving information such as the vehicle speed, wheel speed, acceleration, accelerator pedal operation information, brake operation information, lane detection information, anti-lock brake system (ABS) operation information, tire pressure, steering wheel angle, steering wheel torque, or the LFA and LKA function operation information.

The interface 12 may transmit the driving information detected by the driving information detector 11 to the OBD 20 through the CAN communication during driving inspection of the vehicle 10.

The controller 13 may control overall operations of the LFA and LKA functions applied to an advanced driver assistance system (ADAS) for driving safety assistance of the vehicle 10 and may be linked with various control devices in the vehicle. For example, the controller 13 may be linked with an engine management system (EMS), a telecommunication control unit (TCU), a battery management system (BMS), and a motor driving power steering (MDPS) system and may be connected to the interface 12 via the CAN communication.

Figure 3A:
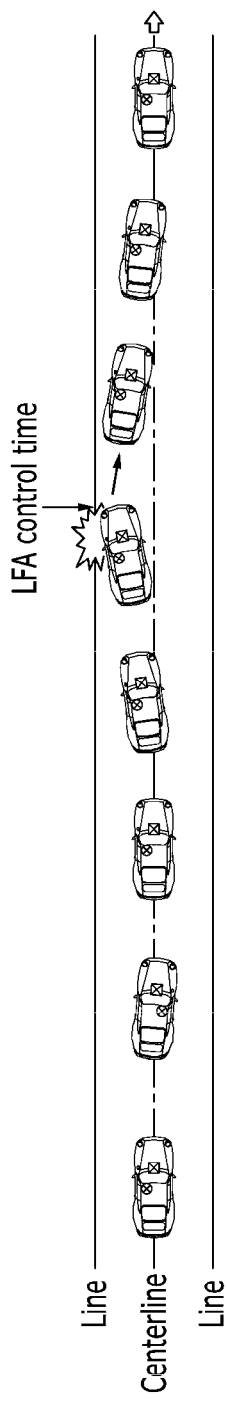
FIGS. 3A and 3B show a running trajectory of a vehicle according to normal control during lane following assist (LFA) function inspection and lane keeping assist (LKA) function inspection according to an exemplary embodiment of the present disclosure.
Figure 3B:
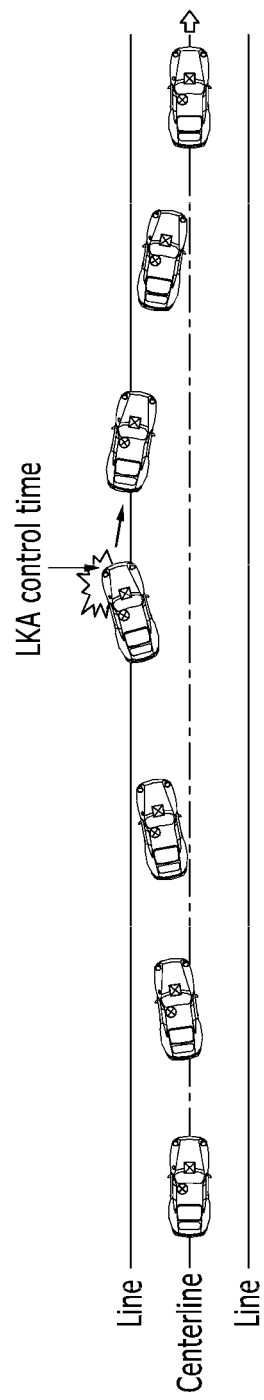

FIGS. 3A and 3B show a running trajectory of the vehicle according to normal control during the LFA and LKA function inspections according to an exemplary embodiment of the present disclosure.

Referring to FIG. 3A, in the LFA function inspection, the controller 13 may recognize lines of the lane through a front sensor S during driving of the vehicle 10 and may generate a warning signal and the steering signal at the LFA function control time when the vehicle is off the centerline of the lane and approaches a line so that the controller keeps the vehicle in the lane.

Referring to FIG. 3B, in the LKA function inspection, the controller 13 may recognize lines of the lane through the front sensor S during driving of the vehicle 10 and may generate the warning signal and the steering signal at the LKA function control time when the vehicle departs from the lane so that the controller keeps the vehicle to be in the center of the lane.

The controller 13 may visually and audibly output the warning signal according to the LFA or LKA function controls through a cluster and a speaker of the vehicle. The controller 13 may control steering angle of a steering wheel of the vehicle 10 through the MDPS system according to the steering signal so that the vehicle stays in the driving lane.

The controller 13 may receive the warning signal and the steering signal from the inspection terminal 30 through the OBD 20 when at least one of the LFA or LKA functions does not operate normally. The controller 13 may visually and audibly output a warning according to the forced warning signal and may adjust the steering angle of the steering wheel according to the forced steering signal.

Figure 4:
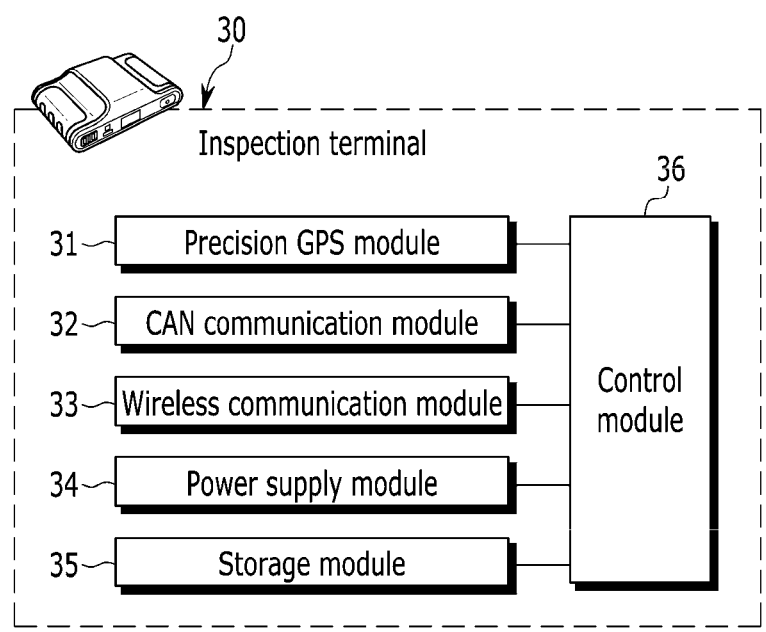
FIG. 4 is a block diagram schematically showing configuration of an inspection terminal according to an exemplary embodiment of the present disclosure.

FIG. 4 is a block diagram schematically showing configuration of the inspection terminal according to an exemplary embodiment of the present disclosure.

Referring to FIG. 4, the inspection terminal 30 may include the precision GPS 31, a CAN communication device 32, a wireless communication device 33, a power supply 34, a storage 35, and a processor (or a control device) 36.

The precision GPS 31 may measure precise position information of the vehicle 10 by eliminating an error factor regarding a satellite.

The precision GPS 31 may measure a precise GPS signal by correcting its GPS signal with reference to a fixed GPS signal of at least one fixed GPS measuring device (not shown). The precision GPS 31 may correct its own GPS signal detected every predetermined time using the fixed GPS signal received every predetermined time. The fixed GPS measuring device may be disposed in the driving test center and may support high-precision GPS signal correction of the precision GPS 31.

The CAN communication device 32 may transmit and receive the OBD ID with the OBD 20 and may transmit and receive CAN data with the vehicle 10 via the OBD 20.

The CAN communication device 32 may receive the driving information, the warning signal, and the forced steering signal according to the LFA and LKA function inspections from the OBD 20. The CAN communication device 32 may transmit the forced warning signal and the forced steering signal to the OBD 20 when the LFA and LKA functions do not operate normally.

The wireless communication device 33 may connect wireless communication with the server 40 and may transmit inspection data collected according to the LFA and LKA function inspections during traveling of the vehicle 10. The inspection data may include driving information, operation state, and log data of the vehicle 10 recorded according to time from start of the LFA and LKA function inspections to end of the inspections.

The wireless communication device 33 may transmit inspection data of the vehicle 10 to the server 40 using the OBD ID attached to the vehicle. Therefore, the server 40 may cumulatively store the inspection data of the vehicle 10 in the DB.

The power supply 34 may supply electric power to the modules for operation of the inspection terminal 30. The power supply 34 may supply power to the modules through a socket connection with the vehicle 10 or a battery. In another exemplary embodiment of the present disclosure, the power supply 34 may be a battery.

The storage 35 may store various programs and data for inspecting lane keeping performance of the vehicle 10 and may store the inspection data collected according to the LFA and LKA function inspections.

The storage 35 may store road map coordinates (x, y) of the driving test center. Coordinates of a virtual centerline formed at a center of both lines of the lane, a virtual inspection start gate SG, a virtual first steering control gate G1, and a virtual second steering control gate G2 may be set on the road map.

Figure 5A:
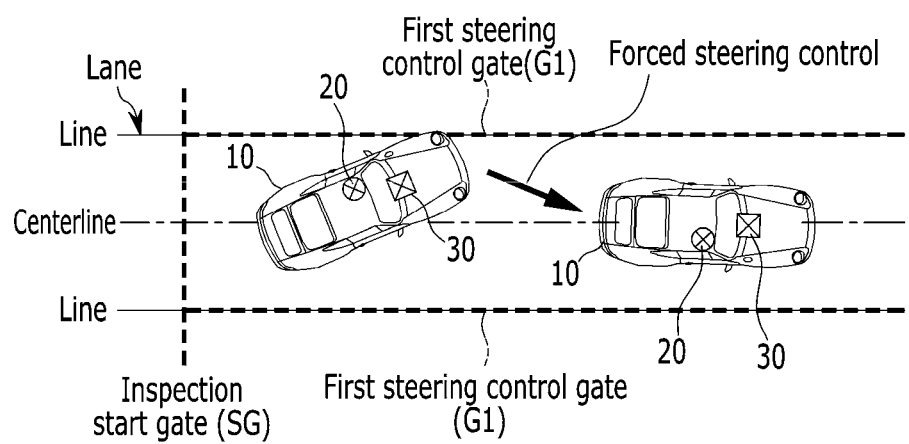
FIGS. 5A and 5B show forced steering control states due to errors in the LFA and LKA function inspections according to an exemplary embodiment of the present disclosure.
Figure 5B:
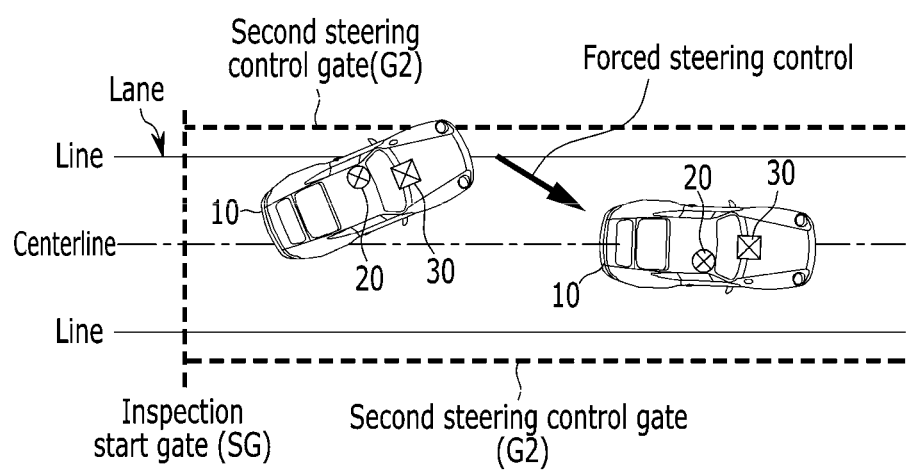

FIGS. 5A and 5B show a forced steering control state due to errors in the LFA and LKA function inspections according to an exemplary embodiment of the present disclosure.

Referring to FIGS. 5A and 5B, coordinates of the virtual inspection start gate SG, the virtual first steering control gate G1, and the virtual second steering control gate G2 may be set on the road. The virtual inspection start gate SG, the virtual first steering control gate G1, and the virtual second steering control gate G2 may correspond to an inspection start line, a first steering control line L1, and a second steering control line L2 of FIG. 1.

The virtual inspection start gate SG may be set in a width direction of the lane. The virtual inspection start gate SG may mean an inspection start point where the LFA and LKA function inspections of the inspection terminal 30 start when the vehicle 10 having the position information of the precision GPS 31 passes the inspection start gate SG.

The virtual first steering control gate G1 may be set at the same coordinate as that of both lines of the lane, and may be used as a criterion for the LFA function error and a forced steering control according to the LFA function error.

The virtual second steering control gate G2 may be set as a parallel line spaced by a certain distance from an outer direction of both lines, and may be a criterion for the LKA function error and a forced steering control according to the LKA function error.

In other words, when the vehicle 10 is out of the virtual first steering control gate G1 and the virtual second steering control gate G2 due to the LFA function error and the LKA function error, the virtual first steering control gate G1 and the virtual second steering control gate G2 may be references with which the inspection terminal 30 gives a forced steering signal to the vehicle.

The processor 36 may control an overall operation of the inspection terminal 30 for inspecting lane keeping performance of the vehicle 10.

The processor 36 may perform the LFA and LKA function inspections during driving of the vehicle 10 so that the processor collects the inspection data to record the collected data in the storage 35.

When power of the inspection terminal 30 mounted on the vehicle 10 is supplied, the processor 36 may connect short-range wireless communication with the OBD 20 and may connect wireless communication with the server 40.

The processor 36 may measure the vehicle position information in real time through the precision GPS 31.

The processor 36 may generate a virtual vehicle 10 having position information, moving direction, and specification of the vehicle based on a precision GPS coordinate of the inspection terminal 30 mounted at a center of the dashboard, and may display the virtual vehicle on the road map. The moving direction of the vehicle 10 may be measured by the precision GPS 31. The virtual vehicle 10 may have a plane size of a real vehicle 10.

The processor 36 may detect a time when the virtual vehicle 10 passes (or is contact with) the virtual first steering control gate G1 or the virtual second steering control gate G2 using precision GPS information measured when the real vehicle 10 moves. In the following description, since the description is continued in terms of the processor 36, the virtual vehicle and the real vehicle are referred to as the vehicle 10.

A forced steering control method according to error determination of the processor 36 in the LFA and LKA function inspections is described with reference to FIGS. 5A and 5B as follows.

Referring to FIG. 5A, the processor 36 may determine that the LFA function does not operate normally when the vehicle 10 is out of the centerline and passes the virtual first steering control gate G1. The processor 36 may transmit the forced warning signal and the forced steering signal according to the LFA function error determination to the OBD 20 and may control the vehicle 10 to stay on the centerline. The processor 36 may safely control a behavior of the vehicle 10 by transmitting a forced brake actuation signal and an emergency light actuation signal to the OBD 20.

Referring to FIG. 5B, the processor 36 may determine that the LKA function does not operate normally when the vehicle 10 passes the second steering control gate G2. The processor 36 may transmit the forced warning signal and the forced steering signal according to the LKA function error determination to the OBD 20 and may control the vehicle 10 to move into the lane.

The processor 36 may safely control a behavior of the vehicle 10 by generating the forced steering signal having a steering angle opposite to a current steering angle of the vehicle. For example, when the steering wheel of the vehicle 10 is rotated by −10 degrees to a left direction from 0 degrees that are a reference angle and indicate a front side of the vehicle, the steering wheel may be rotated by 20 degrees until it reaches 10 degrees to a right direction. The processor 36 may adjust torque of the steering wheel according to an amount of the forced steering angle in order to prevent sudden changes.

The processor 36 may record a determination result of the LFA and LKA function inspections and inspection data regarding the determination result that correspond to the vehicle identification number VIN of the vehicle 10, and may transmit the recorded inspection data to the server 40 via wireless communication.

A method for inspecting vehicle lane keeping performance according to an exemplary embodiment of the present disclosure corresponding to a configuration of the above-described system for inspecting vehicle lane keeping performance will be described with reference to FIGS. 6 and 7. The inspection terminal 30 will be described as the subject or a main agent performing the method for inspecting vehicle lane keeping performance.

Figure 6:
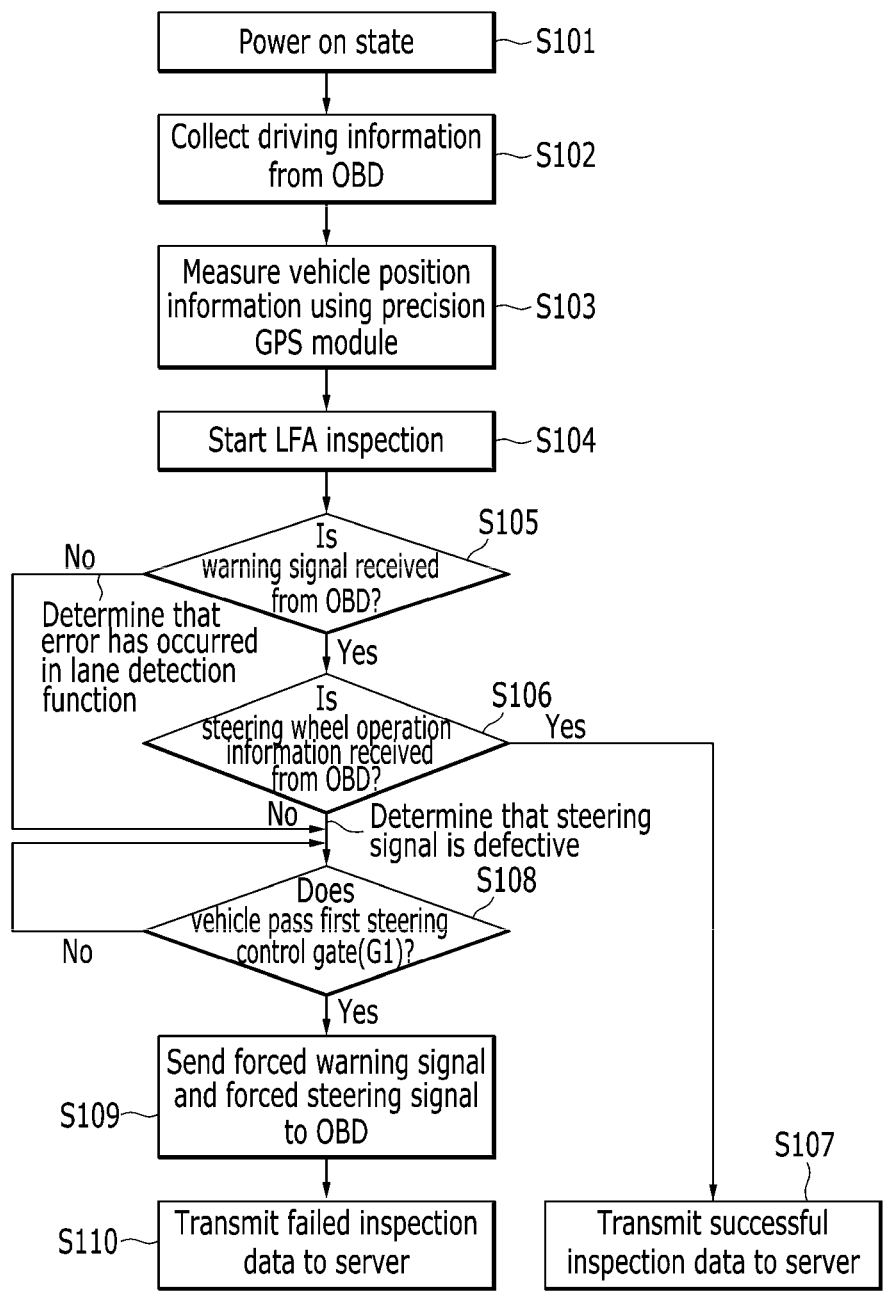
FIG. 6 is a flowchart outlining the LFA function inspection method according to an exemplary embodiment of the present disclosure.

FIG. 6 is a flowchart outlining the LFA function inspection method according to an exemplary embodiment of the present disclosure.

Referring to FIG. 6, the inspection terminal 30 may be operated in a state of being mounted on the center of the dashboard of the vehicle 10. When a power of the inspection terminal 30 is turned on (step S101), the inspection terminal may connect short-range wireless communication with the OBD 20 installed in the vehicle 10 so that the inspection terminal collects driving information according to operation of the vehicle (step S102). The inspection terminal 30 may connect wireless communication with the server 40 that controls the driving test center or a roadway test site for the vehicle 10.

The inspection terminal 30 may measure the vehicle position information using the precision GPS 31 (step S103). The inspection terminal 30 may generate the virtual vehicle 10 having position information, moving direction, and specification of the vehicle on the road map based on the vehicle position information. The virtual vehicle 10 may have the plane size of the real vehicle 10.

The inspection terminal 30 may determine that the vehicle 10 enters an inspection section of the driving test center when the vehicle passes the virtual inspection start gate SG set on the road map so that the inspection terminal starts the LFA function inspection of the vehicle (step S104). The inspection terminal 30 may record inspection data according to collection of the driving information of the vehicle 10 from the vehicle's passage of the inspection start gate to completion of the inspection.

The inspection terminal 30 may determine that the lane detection is successful when the inspection terminal receives the warning signal from the OBD 20 at the LFA function control time when the vehicle 10 is off the center of the lane and approaches a line (Yes in step S105).

The inspection terminal 30 may determine that a LFA steering signal for the LFA function is normal when the inspection terminal receives steering wheel operation information from the OBD 20 (YES in step S106) before the vehicle 10 passes the virtual first steering control gate G1 set on the lines.

The inspection terminal 30 may determine that the LFA function inspection is successful when the vehicle 10 returns to the center of the lane in response to the LFA steering signal, and may transmit data according to the LFA function inspection to the server 40 (step S107).

When the warning signal is not received (NO in the step S105), the inspection terminal 30 may determine that an error has occurred in the lane detecting function.

When the vehicle 10 passes the virtual first steering control gate G1 due to the lane detection error or the lane detection failure (Yes in step S108), the inspection terminal 30 may send or transmit the forced warning signal and the forced steering signal according to the LFA function error to the vehicle via the OBD 20 so that the inspection terminal controls the vehicle to stay on the centerline (step S109).

The inspection terminal 30 may determine that the LFA steering signal is defective when the steering wheel operation information is not received (No in the step S106).

When the vehicle 10 passes the virtual first steering control gate G1 due to a steering signal error or the steering signal failure (Yes in the step S108), the inspection terminal 30 may transmit the forced warning signal and the forced steering signal according to the LFA function error to the vehicle via the OBD 20 so that the inspection terminal controls the vehicle to stay on the centerline (the step S109).

When the vehicle 10 returns to the center of the lane in response to the forced steering signal, the inspection terminal 30 may transmit inspection data, which includes at least one of the lane detection error or steering signal error, to the server 40 (step S110).

FIG. 7 is a flowchart outlining the LKA function inspection method according to an exemplary embodiment of the present disclosure.

Referring to FIG. 7, since the LKA function inspection method is similar to the LFA function inspection method of FIG. 6, redundant description will be omitted and differences will be mainly described.

For example, description of steps S201, S202, and S203 in FIG. 7 is the same as that in the steps S101, S102, and S103 in FIG. 6 and therefore will not be described.

The inspection terminal 30 may determine that the vehicle 10 enters an inspection section of the driving test center when the vehicle passes the virtual inspection start gate SG set on the road map so that the inspection terminal starts the LKA function inspection of the vehicle (step S204).

The inspection terminal 30 may determine that the lane detection is successful when the inspection terminal receives the warning signal from the OBD 20 at the LKA function control time when the vehicle 10 leaves the lane (Yes in step S205).

The inspection terminal 30 may determine that a LKA steering signal for the LKA function is normal when the inspection terminal receives steering wheel operation information from the OBD 20 (YES in step S206) before the vehicle 10 passes the virtual second steering control gate G2.

The inspection terminal 30 may determine that the LKA function inspection is normal when the vehicle 10 enters the lane in response to the LKA steering signal, and may transmit data according to the LKA function inspection to the server 40 (step S207).

When the warning signal is not received (NO in the step S205), the inspection terminal 30 may determine that an error has occurred in a lane detecting function.

When the vehicle 10 passes the virtual second steering control gate G2 due to the lane detection error or the lane detection failure (Yes in step S208), the inspection terminal 30 may send or transmit the forced warning signal and the forced steering signal according to the LKA function error to the vehicle via the OBD 20 so that the inspection terminal controls the vehicle to enter the lane (step S209).

The inspection terminal 30 may determine that the LKA steering signal is defective when the steering wheel operation information is not received (No in the step S206).

When the vehicle 10 passes the virtual second steering control gate G2 due to the steering signal error or the steering signal failure (Yes in the step S208), the inspection terminal 30 may transmit the forced warning signal and the forced steering signal according to the LKA function error to the vehicle via the OBD 20 so that the inspection terminal controls the vehicle to enter the lane (the step S209).

When the vehicle 10 enters the lane in response to the forced steering signal, the inspection terminal 30 may transmit inspection data, which includes at least one of the lane detection error or the steering signal error, to the server 40 (step S210).

Although the present disclosure has been described in relation to the exemplary embodiment thereof, the present disclosure is not limited to the exemplary embodiment described above, and various other modifications are possible.

For example, the LFA and LKA function inspection methods are separately described as shown in FIGS. 6 and 7, but the LFA and LKA function inspections may be performed in succession in one running test.

At this time, after the inspection terminal 30 first performs the LFA function inspection of the vehicle 10 so that the LFA function inspection is successfully performed, the inspection terminal may perform the LKA function inspection by transmitting a message for forcibly disabling the LFA function to the vehicle 10 via the OBD 20 to receive an LFA function deactivation response from the OBD.

This is because the LFA function is first operated before the LKA function which prevents the vehicle from departing from the lane and the LFA function inspection hinders the LKA function inspection.

As described above, the exemplary embodiment of the present disclosure may mount the inspection terminal including the precision GPS in the vehicle to perform the LFA function inspection and the LKA function inspection during driving of the vehicle, thereby solving a human error problem and improving the inspection reliability.

The exemplary embodiment of the present disclosure may reduce a field claim problem and may improve customer satisfaction by providing the vehicle that has proven the LFA function performance and the LKA function performance through a running test of the vehicle on an actual road.

In addition, the exemplary embodiment of the present disclosure may record the inspection history collected from the inspection terminal during the LFA and LKA function inspections of the vehicle so that the inspection history is analyzed when a problem occurs in the LFA and LKA function inspections.

The exemplary embodiment of the present disclosure is not implemented by the aforementioned apparatus and/or method, and may be implemented by a program for operating a function corresponding to the configuration of the exemplary embodiment of the present disclosure, a recording medium in which the program is recorded, and the like, and the implementation may be easily realized from the description of the aforementioned exemplary embodiment by those skilled in the art.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system for inspecting vehicle lane keeping performance, wherein the system inspects a lane following assist function and a lane keeping assist function of a vehicle during driving of the vehicle, the system comprising:
    an on-board diagnostic device that is connected to a controller of the vehicle via controller area network communication to receive driving information according to operation of the vehicle; and
    an inspection terminal, which is installed in the vehicle, configured to:
        communicate with the on-board diagnostic device via short-range wireless communication,
        measure position information of the vehicle on a map of a road during a running test of the vehicle using a precision global positioning system,
        receive the driving information from the on-board diagnostic device to determine whether the lane following assist function operates normally when the vehicle approaches a line of a lane beyond a centerline of the lane or to determine whether the lane keeping assist function operates normally when the vehicle departs from the lane, and
        control the vehicle to move into the lane by applying a steering signal to the vehicle when at least one of the lane following assist function or the lane keeping assist function does not operate normally.

2. The system of claim 1, further comprising a server configured to:
    control an operational status of a driving test center for the vehicle and identify the vehicle via the on-board diagnostic device, and
    collect inspection data according to lane following assist function inspection and lane keeping assist function inspection from the inspection terminal via wireless communication and store the collected inspection data.

3. The system of claim 2, wherein the on-board diagnostic device is configured to match vehicle identification number and specification information of the vehicle with identification of the on-board diagnostic device and subsequently to share the matched information with the inspection terminal and the server.

4. The system of claim 2, wherein
    the precision global positioning system is configured to measure precise position information of the vehicle by eliminating an error factor regarding a satellite, and
    wherein the inspection terminal comprises:
        a controller area network communication device connecting short-range wireless communication with the on-board diagnostic device of the vehicle to transmit and receive data with the on-board diagnostic device;
        a wireless communication device configured to connect wireless communication with the server and to transmit the inspection data collected according to the lane following assist function inspection and the lane keeping assist function inspection;
        a power supply configured to supply power to the inspection terminal through a socket connection with the vehicle or a battery;
        a non-transitory storage configured to store programs and data for inspecting vehicle lane keeping performance of the vehicle and to store the inspection data collected according to the lane following assist function inspection and the lane keeping assist function inspection; and
        a processor configured to perform the lane following assist function inspection and the lane keeping assist function inspection during driving of the vehicle so that the processor collects the inspection data via the on-board diagnostic device to record the collected inspection data in the storage.

5. The system of claim 4, wherein the inspection data includes driving information, an operation state, and log data of the vehicle recorded according to a period of time from start of the lane following assist function and the lane keeping assist function to end of the lane following assist function and the lane keeping assist function.

6. The system of claim 4, wherein the processor is further configured to:
    generate a virtual vehicle having position information, a moving direction, and specifications of the vehicle based on a precision global positioning system coordinate of the inspection terminal mounted at a center of a dashboard of the vehicle, and
    display the virtual vehicle on the map of the road.

7. The system of claim 4, wherein the storage is configured to store a road map coordinate, and
    wherein coordinates of a virtual centerline at a center of both lines of the lane, a virtual inspection start gate in a width direction of the lane, a virtual first steering control gate on both lines, and a virtual second steering control gate spaced by a predetermined distance from an outer direction of both lines are set on the map of the road.

8. The system of claim 7, wherein the processor is further configured to:
   determine that the lane following assist function does not operate normally when the vehicle is out of the virtual centerline and crosses over the virtual first steering control gate, and
   transmit a warning signal and the steering signal according to a lane following assist function error determination to the on-board diagnostic device to control the vehicle to stay on the virtual centerline.

9. The system of claim 7, wherein the processor is further configured to:
   determine that the lane keeping assist function does not operate normally when the vehicle passes the virtual second steering control gate, and
   transmit a warning signal and the steering signal according to a lane keeping assist function error determination to the on-board diagnostic device to control the vehicle to enter the lane.

10. The system of claim 4, wherein the processor is further configured to record a determination result of the lane following assist function inspection and the lane keeping assist function inspection and record inspection data regarding the determination result of the lane following assist function inspection and the lane keeping assist function inspection, the inspection data corresponding to a vehicle identification number of the vehicle, and
   transmit the recorded inspection data to the server via wireless communication.

11. The system of claim 1, wherein the inspection terminal is configured to determine, through the precision global positioning system, whether the vehicle under the running test approaches the line of the lane off the centerline of the lane or departs from the lane.

12. The system of claim 1, wherein the inspection terminal is configured to generate the steering signal having a steering angle opposite to a current steering angle of the vehicle.

13. A method for inspecting vehicle lane keeping performance of an inspection terminal which is installed in a vehicle and inspects a lane following assist function and a lane keeping assist function of the vehicle during a road running test of the vehicle, the method comprising steps of:
   a) connecting, by the inspection terminal, short-range wireless communication with an on-board diagnostic device that is installed in the vehicle when a power of the inspection terminal is turned on, and measuring the vehicle position information on a map of a road using a precision global positioning system;
   b) determining, by the inspection terminal, that the vehicle enters an inspection section when the vehicle crosses over a virtual inspection start gate set on a lane so that the inspection terminal collects driving information of the vehicle from the on-board diagnostic device;
   c) determining, by the inspection terminal, whether the lane following assist function operates normally when the vehicle is off a centerline of the lane and approaches a line of the road;
   d) determining, by the inspection terminal, whether the lane keeping assist function operates normally when the vehicle departs from the lane; and
   e) controlling, by the inspection terminal, the vehicle to move into the lane by applying a steering signal to the vehicle when at least one of the lane following assist function or the lane keeping assist function does not operate normally.

14. The method of claim 13, wherein step a) further comprises:
   generating, by the inspection terminal, a virtual vehicle having position information, a moving direction, and specifications of the vehicle based on a precision global positioning system coordinate of the inspection terminal mounted at a center of a dashboard of the vehicle; and
   displaying the virtual vehicle on the map of the road.

15. The method of claim 13, wherein step b) further comprises recording, by the inspection terminal, inspection data according to collection of the driving information of the vehicle from a vehicle's passage of the virtual inspection start gate to completion of inspection of the lane following assist function and the lane keeping assist function.

16. The method of claim 13, wherein step c) further comprises:
   determining, by the inspection terminal, an error in a lane detecting function included in the lane following assist function when a warning signal is not received from the on-board diagnostic device at a lane following assist function control time when the vehicle is off the centerline of the lane and approaches the line; and
   determining, by the inspection terminal, that the steering signal for the lane following assist function is defective when the vehicle passes a virtual first steering control gate set on both lines of the lane in a state where steering wheel operation information for the lane following assist function is not received from the on-board diagnostic device after the warning signal is received.

17. The method of claim 16, wherein step e) further comprises transmitting, by the inspection terminal, the warning signal and the steering signal according to a lane following assist function error to the vehicle so that the inspection terminal controls the vehicle to stay on the centerline.

18. The method of claim 13, wherein step d) further comprises:
   determining, by the inspection terminal, an error in a lane detecting function included in the lane keeping assist function when a warning signal is not received from the on-board diagnostic device at the lane keeping assist function control time when the vehicle leaves the lane; and
   determining, by the inspection terminal, that the steering signal for the lane keeping assist function is defective when the vehicle passes a virtual second steering control gate spaced by a predetermined distance from an outer direction of both lines of the lane in a state where steering wheel operation information for the lane keeping assist function is not received from the on-board diagnostic device after the warning signal is received.

19. The method of claim 18, wherein step e) further comprises transmitting, by the inspection terminal, the warning signal and the steering signal according to a lane keeping assist function error to the vehicle so that the inspection terminal controls the vehicle to enter the lane.

20. The method of claim 13, further comprising, between step c) and step d), performing, by the inspection terminal, the lane keeping assist function inspection after the inspection terminal transmits a message for forcibly disabling the lane following assist function to the vehicle via the on-board diagnostic device to receive a lane following assist function deactivation response.

* * * * *